United States Patent
Mima et al.

(10) Patent No.: US 10,303,476 B2
(45) Date of Patent: May 28, 2019

(54) ARITHMETIC PROCESSOR WITH LOAD UNIT FOR IMPROVED REGISTER USE

(71) Applicant: SANKEN ELECTRIC CO., LTD., Niiza-Shi, Saitama (JP)

(72) Inventors: Kazuhiro Mima, Niiza (JP); Hiroki Yukiyama, Niiza (JP); Takanaga Yamazaki, Tama (JP)

(73) Assignee: SANKEN ELECTRIC CO., LTD., Niiza-shi (JP)

( * ) Notice: Subject to any disclaimer, the term of this patent is extended or adjusted under 35 U.S.C. 154(b) by 411 days.

(21) Appl. No.: 14/748,327

(22) Filed: Jun. 24, 2015

(65) Prior Publication Data

US 2016/0054999 A1  Feb. 25, 2016

(30) Foreign Application Priority Data

Aug. 25, 2014  (JP) .................................. 2014-170322

(51) Int. Cl.
*G06F 9/30*  (2018.01)
*G06F 9/38*  (2018.01)

(52) U.S. Cl.
CPC ...... *G06F 9/30145* (2013.01); *G06F 9/30043* (2013.01); *G06F 9/30167* (2013.01); *G06F 9/3832* (2013.01)

(58) Field of Classification Search
CPC ............ G06F 9/30043; G06F 9/30101; G06F 9/30167
USPC ........................................................ 708/495
See application file for complete search history.

(56) References Cited

U.S. PATENT DOCUMENTS

| 6,219,779 | B1 * | 4/2001 | Takayama | G06F 9/30101 712/210 |
| 6,795,908 | B1 * | 9/2004 | Lee | G06F 9/30043 712/229 |
| 7,269,710 | B1 * | 9/2007 | Chan | G06F 9/30167 711/203 |
| 2006/0047937 | A1 * | 3/2006 | Selvaggi | G06F 9/30101 711/220 |
| 2013/0145130 | A1 * | 6/2013 | Brelot | G06F 9/384 712/217 |

(Continued)

FOREIGN PATENT DOCUMENTS

JP  2013-025590 A  2/2013

*Primary Examiner* — Aimee Li
*Assistant Examiner* — Courtney P Carmichael-Moody
(74) *Attorney, Agent, or Firm* — Metrolexis Law Group, PLLC

(57) ABSTRACT

An arithmetic processor of an embodiment comprises program counter, a program memory, registers, and a decoder. Also the arithmetic processor comprises an arithmetic unit that carries out an operation using the operand and operator acquired from the registers based on a decode result by the decoder, a data memory that stores constant data and an address in association with the data, and a load unit that comprises a load data address storing unit that stores a load data address indicating an address where the constant data is stored; and
an increment unit that updates the load data address stored in the load data address storing unit. The load unit loads, from the data memory, constant data corresponding to an address specified by an operand of a load instruction from the decoder, and stores the constant data in a specific one of the registers.

4 Claims, 5 Drawing Sheets

(56) References Cited

U.S. PATENT DOCUMENTS

2013/0205123 A1* 8/2013 Vorbach .............. G06F 9/30043
                                                        712/221
2014/0013084 A1* 1/2014 Li ....................... G06F 9/30043
                                                        712/208

* cited by examiner

Fig. 5

| Instruction Format ||||||| Instruction | Operation | Exec Cycle |
| MSB(bit15) |||||LSB(bit0)| | | |
| TRIG_WAIT | TRIG_WHAT | EVENT | OPCODE || FIELD A | FIELD B | | | |
| T | WHAT | E | 0 | 0 | 0 | don't care | don't care | 0x0 NOP | No Operation | 1 |
| T | WHAT | E | 0 | 0 | 1 | next PC || 0x1 JMP | Jump | 1 |
| T | WHAT | E | 0 | 1 | 0 | Rm | Rn | 0x2 MUL | ACC←Rn x Rm | 1 |
| T | WHAT | E | 0 | 1 | 1 | Rm | Rn | 0x3 MAC | ACC←ACC + Rn x Rm | 1 |
| T | WHAT | E | 1 | 0 | 0 | Rm | Rn | 0x4 DIV | ACC←Rn/Rm | 8 |
| T | WHAT | E | 1 | 0 | 1 | Rm | #n | 0x5 LSF | ACC←Rm<<#n | 1 |
| T | WHAT | E | 1 | 1 | 0 | Rm | #n | 0x6 RSF | Rm←ACC>>#n | 1 |
| T | WHAT | E | 1 | 1 | 1 | Rm | Rn | 0x7 MVC | Chain Move (delay element) Rm←Rm-1←...←Rn+1←Rn Initial Rm is destroyed Rn is kept same value | 1 |

ARITHMETIC PROCESSOR WITH LOAD UNIT FOR IMPROVED REGISTER USE

CROSS REFERENCE TO RELATED APPLICATIONS

This application claims priority based on 35 USC 119 from prior Japanese Patent Application No. 2014-170322 filed on Aug. 25, 2014, entitled "ARITHMETIC PROCESSOR", the entire contents of which are hereby incorporated by reference.

TECHNICAL FIELD

The disclosure relates to a technology of an arithmetic processor, and more particularly relates to an arithmetic processor such as a digital signal processor (DSP) included in a microcomputer for a digitally-controlled power source.

BACKGROUND

FIG. 4 is a diagram illustrating a configuration of a processor in a conventional arithmetic processor. In digital signal processor DSP0 illustrated in FIG. 4, control unit CU performs operation control of the entire processor. Control register CR includes a group of registers for controlling operations of the processor, and also includes, for example, a program counter (PC) indicating the location of an instruction executing a program. Program memory PM stores the program as a sequence of instructions, and stores the program in 16 bits×32 words (up to 128 words).

Register file RF includes sixteen 16-bit general-purpose registers R0 to R15 to store variables and constant data to be used during execution of the program.

Arithmetic unit group EU includes divider DIV, multiplier MUL, arithmetic unit ALU, accumulator ACC, and barrel shifter SFT. Divider DIV reads Rn and Rm data in register file RF, and carries out an operation of Rn (16-bit accuracy)/Rm (16-bit accuracy) to 16-bit accuracy×(1/16-bit accuracy) to 16-bit accuracy×16-bit accuracy to 32-bit accuracy.

Multiplier MUL reads Rn and Rm data in register file RF, and performs multiplication of 16 bits×16 bits to 32 bits. Arithmetic unit ALU carries out an addition operation of 36 bits+36 bits to 36 bits. Accumulator ACC includes a register having a 36-bit length, configured to temporarily store operation results obtained by divider DIV, multiplier MUL and arithmetic unit ALU. Barrel shifter SFT includes 0 to 15 bits, and shifts data from accumulator ACC to the right and stores the shift result in the designated register in register file RF.

The processor thus configured executes an instruction (program) through the following steps.

First, program counter PC shows a program memory address, and an instruction stored in the address is read (fetched) (Step S1). Then, the fetched instruction is decoded (interpreted) (Step S2).

Next, an operation corresponding to the result of the decoding is carried out (Step S3). Thereafter, program counter PC is updated (Step S4). More specifically, in the case of a jump instruction, program counter PC is updated to nextPC in the instruction, or otherwise program counter PC is updated to a value obtained by adding 1 to the value of current program counter PC. Steps S1 to S4 described above are repeated.

FIG. 5 is a diagram illustrating an instruction set held by the processor in the conventional arithmetic processor. In FIG. 5, information on instruction format (Instruction Format), instruction type (Instruction), operation content (Operation) and execution cycle (Exec. Cycle) is recorded in an instruction code table. The instruction format includes information of instruction stop flag (TRIG_WAIT), bit field (TRIG_WHAT), event bit (EVENT), operation code (OPCODE), instruction fieldA (FIELDA) and instruction field B (FIELDB) for 16 bits from the most significant bit MSB (Bit 15) to the least significant bit (Bit 0).

The instruction length is fixed to 16 bits. The operation code (OPCODE) is fixed to 3 bits. Rm/Rn is a 16-bit register designation field, and m, n=0 to 15.

Here, for discussion of problems of the processor, the configuration of the processor and characteristics of the instruction set are described. The processor is categorized as what is termed DSP including a multiplier and a divider. The instruction length is fixed to 16 bits. An operation target is only data stored in the registers as operands and operators.

In the processor having the above configuration, an operand when carrying out an operation (MUL, MAC, DIV) is only register Rn/Rm, and data values cannot be directly referred to as the operation target.

The conventional technology is disclosed in Japanese Patent Application Publication No. 2013-25590.

However, the processor thus configured tends to run short of a data storage area. It is inefficient to allocate the constant data to R0 to R15 that can be used as variables. Operations of constant data and variables are frequently carried out in a target application of the processor, and such data storage area shortage or inefficiency should be addressed.

Generally conceivable methods for avoiding the above problem are to directly specify a constant value in an operand of an operation instruction, and also to specify a memory address where the constant value is stored and read the constant value to be used by the operation instruction from the memory.

However, such methods need to specify the constant value or memory address for the operand. Therefore, the current instruction having the fixed length of 16 bits runs short of the number of bits for designating the operand.

In order to avoid such a situation, it may be possible to extend the instruction length to 24 bits, for example, and specify the constant value or memory address using the extended part. However, such extension of the instruction length increases the program size, and thus increases a required program memory size. Furthermore, there is a problem of lacking compatibility of a previously created program.

Meanwhile, use of variable-length instructions in which the instruction length only for a required instruction is extended can be expected to keep the program size small. However, a fetch of the variable-length instruction needs to involve recognizing of the instruction length of the instruction during decoding of the instruction. As a result, a circuit in a decode unit becomes complex.

SUMMARY

An aspect of an embodiment provides an arithmetic processor that comprises a program counter that stores address of an instruction executing a program, a program memory that stores the program as a sequence of instructions, registers that stores an operand, an operator or a variable for execution of the program, a decoder that decodes an instruction stored at the address in the program counter, the instruction read from the program memory, an arithmetic unit that carries out an operation using the operand and operator acquired from the registers based on a decode result by the decoder, a data memory that stores constant data and an address in association with the data, and a load unit, comprising a load data address storing unit that stores a load data address indicating an address where the constant data is stored, and an increment unit that updates the load data address stored in the load data address storing unit, wherein the load unit loads, from the data memory, constant data corresponding to an address specified by an operand of a load instruction from the decoder, and stores the constant data in a specific one of the registers.

BRIEF DESCRIPTION OF THE DRAWINGS

FIG. 5 is a diagram illustrating an instruction set held by the processor in the conventional arithmetic processor.

DETAILED DESCRIPTION

Figure 1:
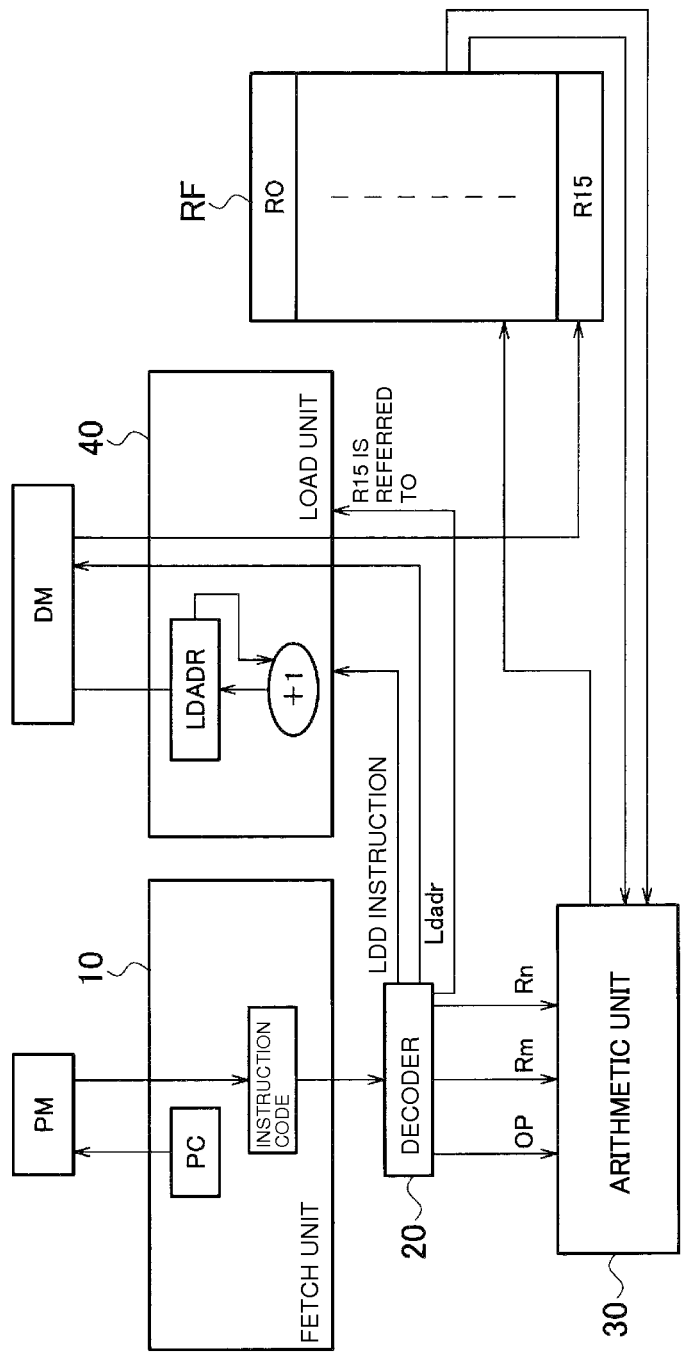
FIG. 1 is a diagram illustrating an overall configuration of an arithmetic processor according to an embodiment.

With reference to the drawings, an embodiment is described in detail below. Note that the same components as those in the conventional arithmetic processor are denoted by the same reference numerals as those used in the conventional technology, and description thereof is omitted.

FIG. 1 is a diagram illustrating an overall configuration of an arithmetic processor according to an embodiment. The arithmetic processor illustrated in FIG. 1 includes fetch unit 10, decoder 20, arithmetic unit 30, load unit 40, register file RF, program memory PM and data memory DM.

Program memory PM stores a program (arithmetic processing sequence) as a sequence of instructions. Fetch unit 10 includes program counter PC indicating the location of an instruction executing a program. Fetch unit 10 fetches an instruction at the location indicated by program counter PC from program memory PM, and outputs the instruction to decoder 20.

Figure 4:
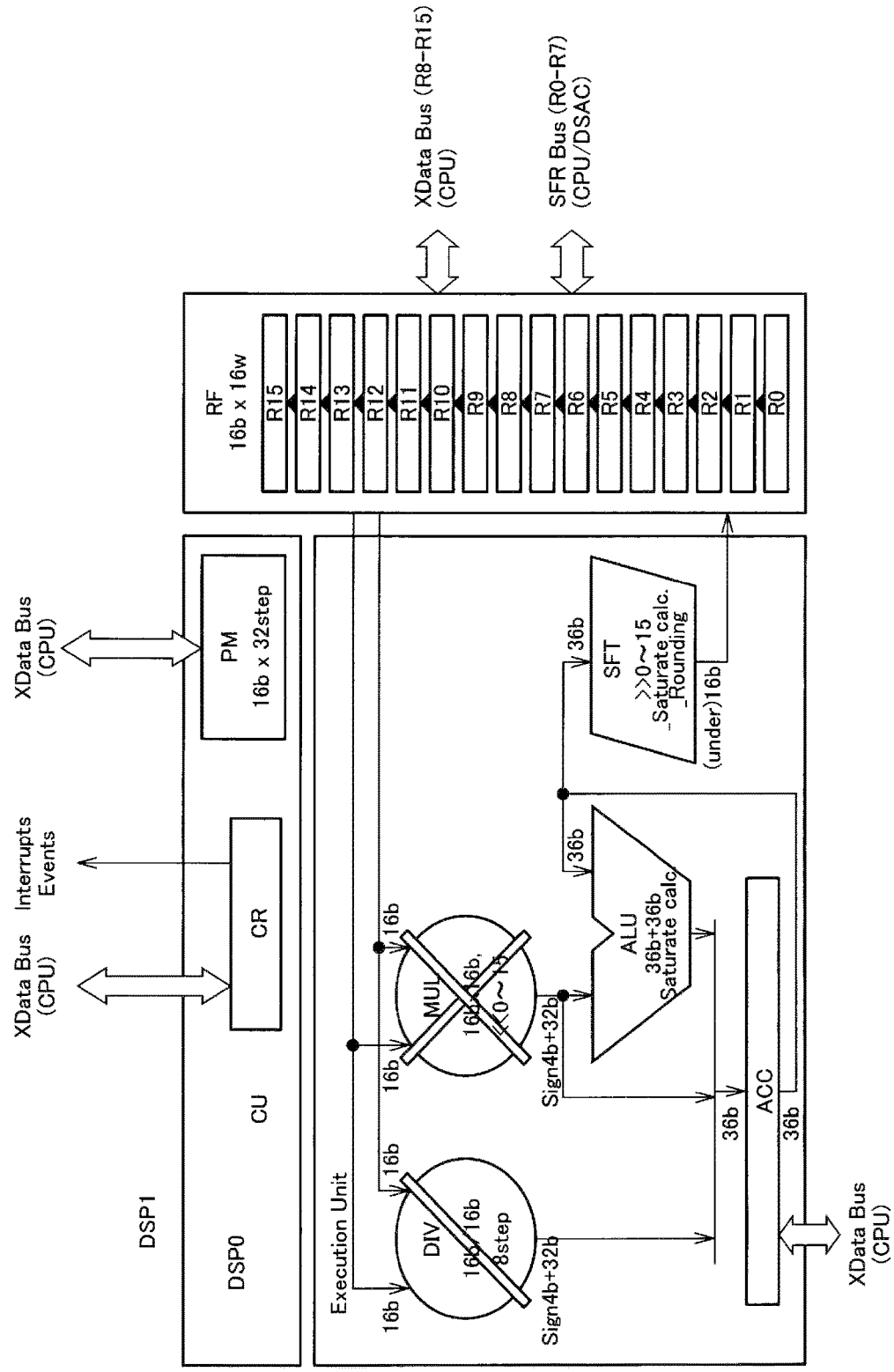
FIG. 4 is a diagram illustrating a configuration of a processor in a conventional arithmetic processor.

Decoder 20 interprets the instruction from fetch unit 10, and outputs the instruction to arithmetic unit 30. Arithmetic unit 30 includes divider DIV, multiplier MUL, arithmetic unit ALU, accumulator ACC and barrel shifter SFT as illustrated in FIG. 4. Arithmetic unit 30 carries out an operation using operands and operators from registers R0 to R15 based on a decode result interpreted by decoder 20.

Register file RF includes sixteen 16-bit general-purpose registers R0 to R15 to store operands, operators and variables to be used during program execution.

Next, description is given of a configuration of the arithmetic processor according to the embodiment. In this embodiment, the instruction length is set to 16 bits, in order to enable program compatibility to be maintained. Data memory DM stores constant data and addresses in association with each other. In the embodiment, data memory DM is provided independently of program memory PM. However, program memory PM and data memory DM may be formed from a common memory, and programs and constant data may be stored therein.

Load unit 40 includes load data address pointer LDADR indicating an address stored in data memory DM. Load unit 40 loads, from data memory DM, constant data corresponding to an address specified by an operand of a load instruction (LDD instruction) from decoder 20, stores the constant data in a specific register, e.g., register R15 among registers R0 to R15, and increments the address indicated by load data address pointer LDADR by 1.

Figure 2A:
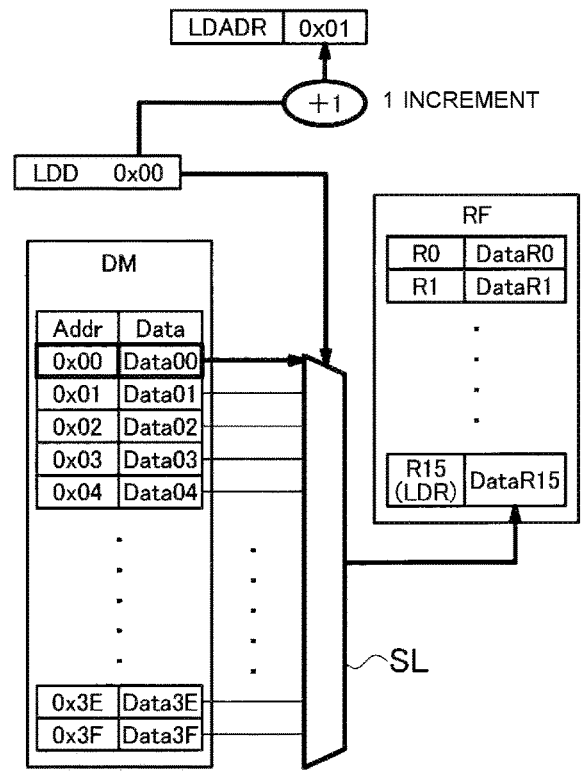
FIGS. 2A and 2B are diagrams illustrating operations of a load unit in the arithmetic processor according to the embodiment.
Figure 2B:
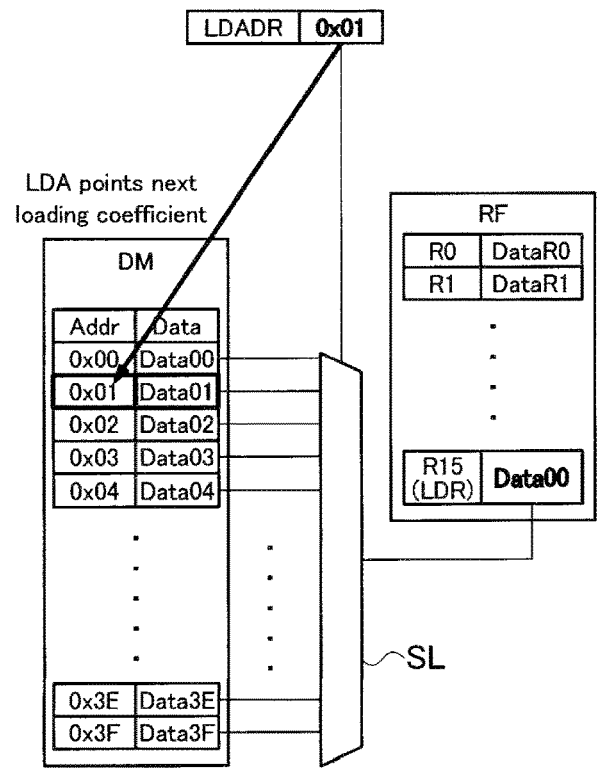

FIGS. 2A and 2B are diagrams illustrating operations of the load unit in the arithmetic processor according to the embodiment. In FIG. 2A, data memory DM stores addresses (Addr) and data (Data) in association with each other. For example, Data00 is stored in Addr0x00. Data DataR0 to DataR15 are stored in registers R0 to R15 in register file RF.

FIG. 2A illustrates an operation when "LDD 0x00" is executed. As illustrated in FIG. 2A, load unit 40 loads Data00 from Addr0x00 in data memory DM using operand 0x00 of the LDD instruction as a memory address, and stores the data in register R15 through selector SL. More specifically, as illustrated in FIG. 2B, DataR15 stored in register R15 is rewritten into Data00.

Also, as illustrated in FIG. 2B, load unit 40 stores the next data address (0x00+1=0x01) in load data address pointer LDADR at the same time as the execution of the LDD instruction. Load data address pointer LDADR indicates a data memory address wished to be referred to after the data stored in register R15.

Moreover, when specific register R15 is referred to by the operation instruction, load unit 40 loads, from data memory DM, constant data corresponding to the address indicated by load address pointer LDADR, stores the constant data in specific register R15, and increments the address indicated by load data address pointer LDADR by 1.

More specifically, load unit 40 includes a sequential load mechanism to automatically load data in the order of the addresses in data memory DM when an operand of an arbitrary instruction is specified from decoder 20 and register R15 is referred to, even if another LDD instruction is not inputted to load unit 40 from decoder 20.

Figure 3A:
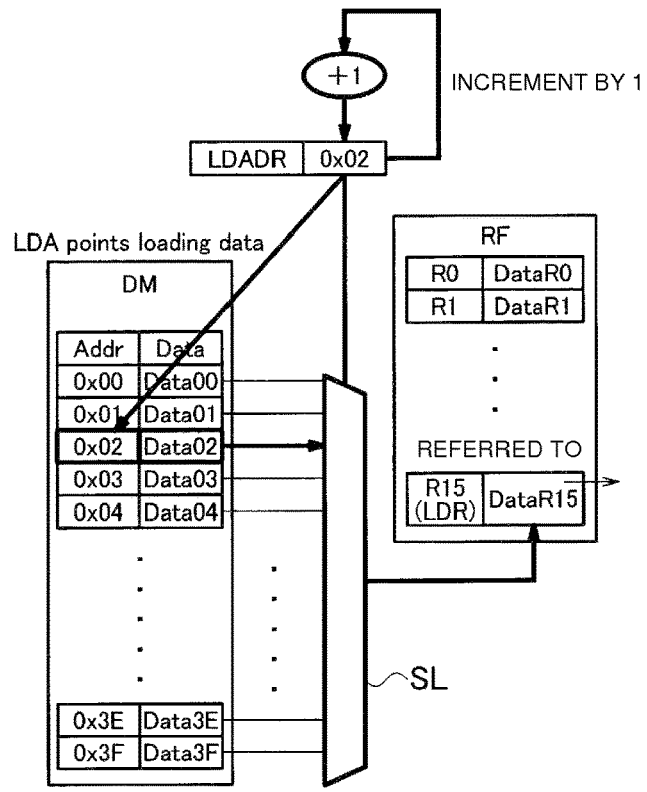
FIGS. 3A and 3B are diagrams illustrating a sequential load mechanism in the arithmetic processor according to the embodiment.
Figure 3B:
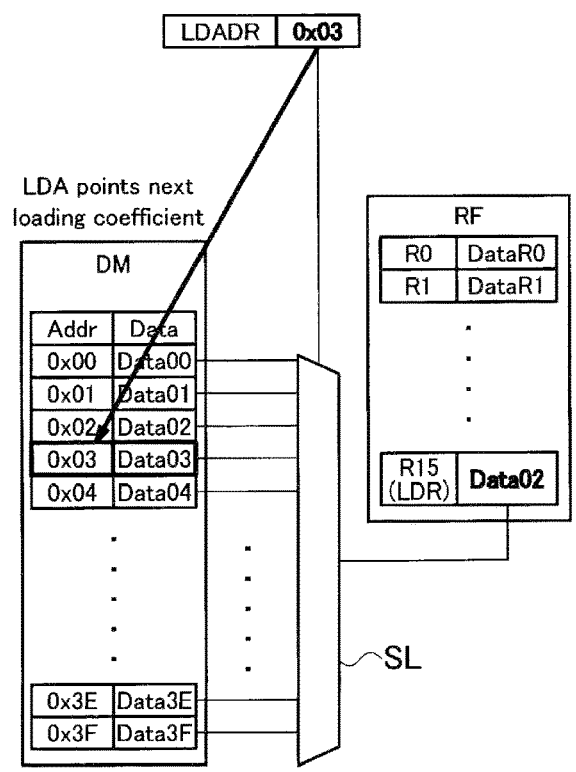

FIGS. 3A and 3B are diagrams illustrating the sequential load mechanism in the arithmetic processor according to the embodiment. In FIG. 3, data is loaded to register R15 from the memory address stored in load address pointer LDADR, and at the same time, the address indicated by load address pointer LDADR is incremented by 1.

As illustrated in FIG. 3A, when DataR15 stored in register R15 is referred to as the operand, data (Data02) in a memory address (0x02) indicated by load address pointer LDADR is loaded in the same cycle at the same time, and stored in register R15 (FIG. 3B). At the same time as the data load, the address indicated by load address pointer LDADR is incremented by 1 (0x02+1=0x03).

The functions of load unit 40 described above eliminate the need to use registers R0 to R14 for storage of constant data, and thus registers R0 to R14 can be used for other operations.

Also, it is no longer required to issue an LDD instruction every time constant data is loaded. Thus, the processing speed of the DSP can be improved.

As described above, according to Embodiment 1, load unit 40 loads, from data memory DM, constant data corresponding to an address specified by an operand of a load instruction from decoder 20, stores the constant data in specific register R15 among registers R0 to R15, and updates the address indicated by load data address pointer LDADR. Thus, registers R0 to R14 can be used for other operations by reducing the storage of the constant data in registers R0 to R14 that can be used as variables.

As described above, according to this embodiment, an arithmetic processor can be provided, which enables registers to be used for other operations by reducing the storage of constant data in the registers that can be used as variables.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An arithmetic processor comprising:
a program memory that stores a program as a sequence of instructions comprising operation instructions and load instructions;
a program counter that indicates an address in the program memory of an instruction executing in the program;
a decoder that decodes the instruction read from the address in the program memory indicated by the program counter, into an operand, an operator, or a variable for execution of the instruction;
an arithmetic unit that carries out an operation associated with the instruction using the operand and operator acquired based on a decode result by the decoder;
a data memory that stores constant data from a starting address in the data memory where the constant data is stored; and
a load unit, comprising:
a load data address storing unit that stores a load data address indicating an address in the data memory where the constant data is stored; and
an increment unit that increments the load data address stored in the load data address storing unit to a next address in the data memory where the constant data is stored, wherein
when the instruction is a load instruction, the load unit loads, from the data memory, the constant data stored at an address specified by an operand of the load instruction, decoded by the decoder, stores the constant data in a specific one of a plurality of registers, and increments the load data address stored in the load data address storing unit, and
when the instruction is an operation instruction referring to the specific one of the plurality of registers:
the arithmetic unit carries out the operation corresponding to the operation instruction using the constant data stored in the specific one of the plurality of registers, and
the load unit loads, from the data memory, next constant data stored at the incremented load data address stored in the load data address storing unit, stores the next constant data in the specific one of the plurality of registers, and increments, via the increment unit, the load data address, and the arithmetic unit carries out the operation corresponding to the operation instruction using the constant data stored in the specific one of the plurality of registers and the load unit loads the next constant data in a same cycle.

2. The arithmetic processor of claim 1, wherein the data memory and the program memory comprise a common memory.

3. An arithmetic processor comprising:
a program memory that stores a program as a sequence of instructions comprising operation instructions and load instructions;
a program counter that indicates an address in the program memory of an instruction executing in the program;
a decoder that decodes the instruction read from the address in the program memory indicated by the program counter, into an operand, an operator, or a variable for execution of the instruction;
an arithmetic unit that carries out an operation associated with the instruction using the operand and operator acquired based on a decode result by the decoder;
a data memory that stores constant data from a starting address in the data memory where the constant data is stored; and
a load unit, comprising:
a load data address storing unit that stores a load data address indicating an address in the data memory where the constant data is stored; and
an increment unit that increments the load data address stored in the load data address storing unit to a next address in the data memory where the constant data is stored, wherein
when the instruction is a load instruction, the load unit loads, from the data memory, the constant data stored at an address specified by an operand of the load instruction, decoded by the decoder, stores the constant data in a specific one of a plurality of registers, and increments the load data address stored in the load data address storing unit, and
when the instruction is the operation instruction referring to the specific one of the plurality of registers:
the arithmetic unit carries out the operation corresponding to the operation instruction using the constant data stored in the specific one of the plurality of registers,
the increment unit increments the address stored in the load data address storing unit in a same cycle, and
the load unit loads, from the data memory, next constant data stored at the incremented load data address stored in the load data address storing unit, stores the next constant data in the specific one of the plurality of registers, and increments, via the increment unit, the load data address.

4. The arithmetic processor according to claim 3, wherein the data memory and the program memory comprise a common memory.

* * * * *